United States Patent [19]

Besenfelder

[11] 4,115,759

[45] Sep. 19, 1978

[54] MULTIPLE BIT DESKEW BUFFER

[75] Inventor: Edward Roald Besenfelder, Phoenix, Ariz.

[73] Assignee: Honeywell Information Systems Inc., Phoenix, Ariz.

[21] Appl. No.: 822,476

[22] Filed: Aug. 8, 1977

[51] Int. Cl.² ............................................. G06K 5/04
[52] U.S. Cl. ............................... 340/146.1 F; 360/26; 364/900
[58] Field of Search ................... 340/146.1 F; 360/26; 364/900

[56] References Cited

U.S. PATENT DOCUMENTS

| | | | |
|---|---|---|---|
| 3,708,783 | 1/1973 | Hedin | 340/146.1 F |
| 3,790,954 | 2/1974 | Devore et al. | 340/146.1 F |
| 3,792,436 | 2/1974 | De Voy et al. | 340/146.1 F |
| 3,800,280 | 3/1974 | Heffner | 340/146.1 F |
| 3,863,228 | 1/1975 | Taylor | 364/900 |
| 3,882,459 | 5/1975 | Barlow et al. | 340/146.1 F |

Primary Examiner—Charles E. Atkinson
Attorney, Agent, or Firm—Vincent B. Ingrassia; William W. Holloway, Jr.; Ronald T. Reiling

[57] ABSTRACT

A multiple bit deskew buffer while providing skew correction for multi-track data read on mass storage devices is disclosed. All data transfers are synchronized to one basic clock eliminating the multiple clocking systems utilized in the prior art. The invention is arranged such that it could be easily modified so as to vary the number of bytes of data held in the byte buffer by either hardware, firmware, or software means.

8 Claims, 8 Drawing Figures

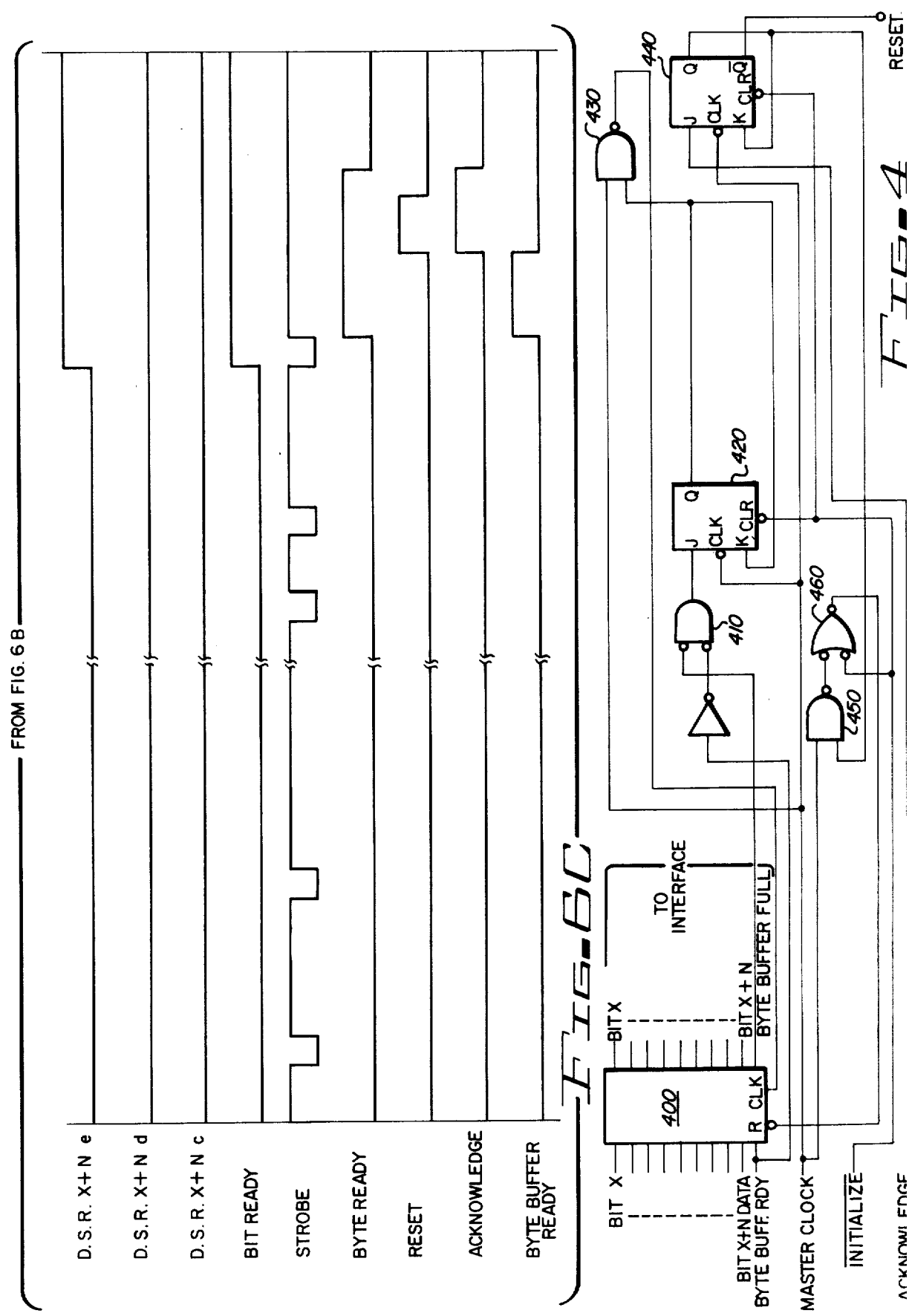

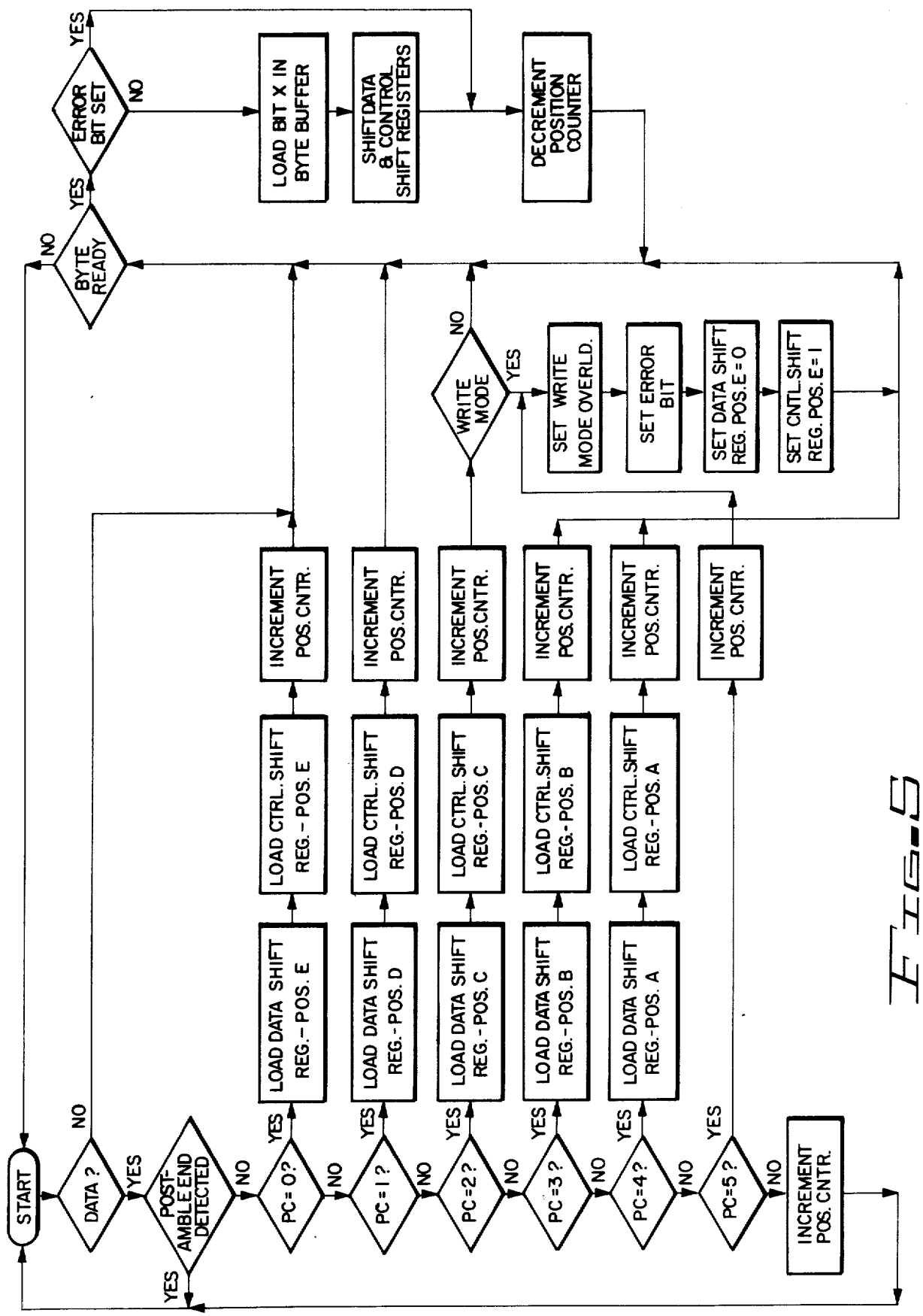

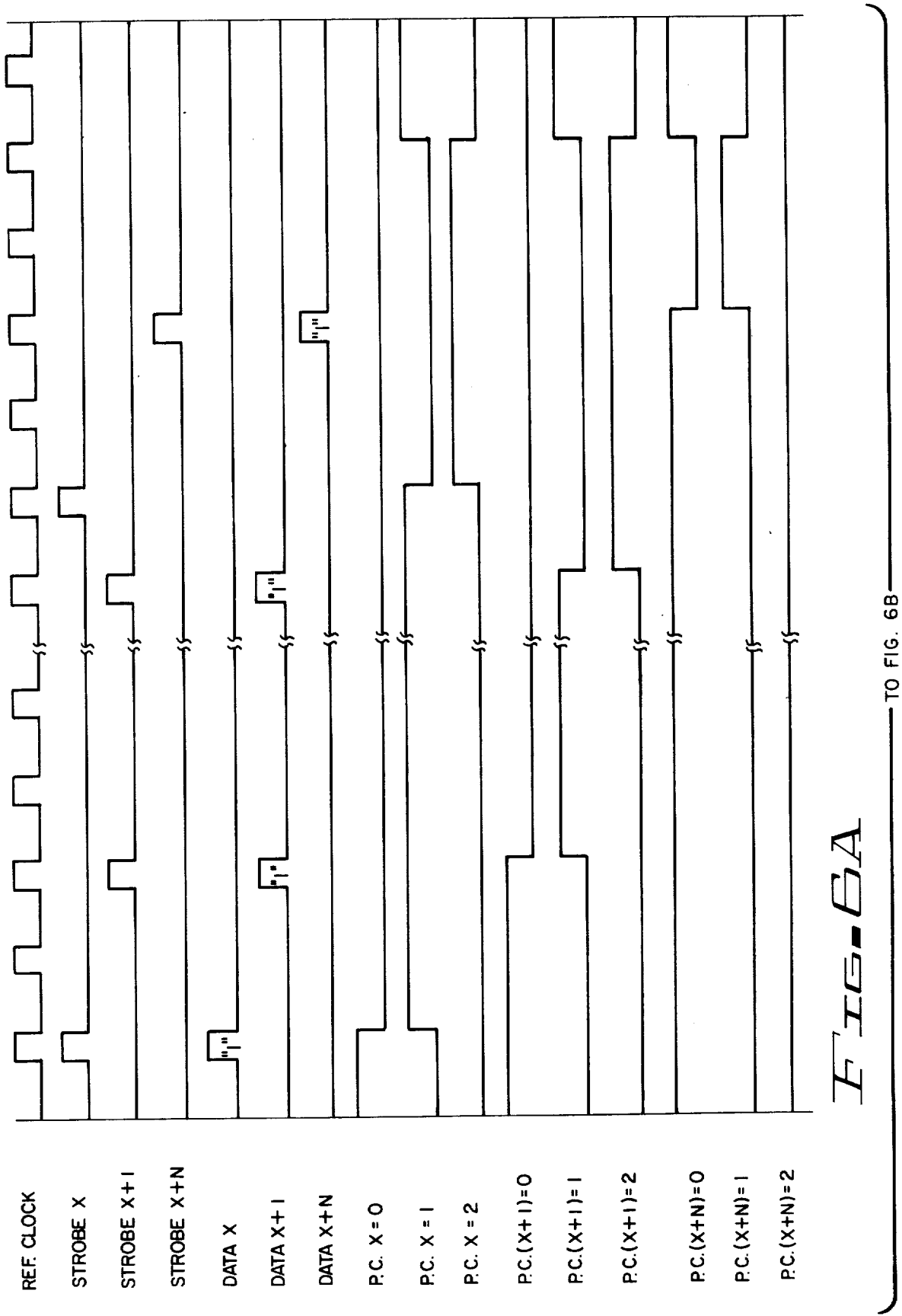

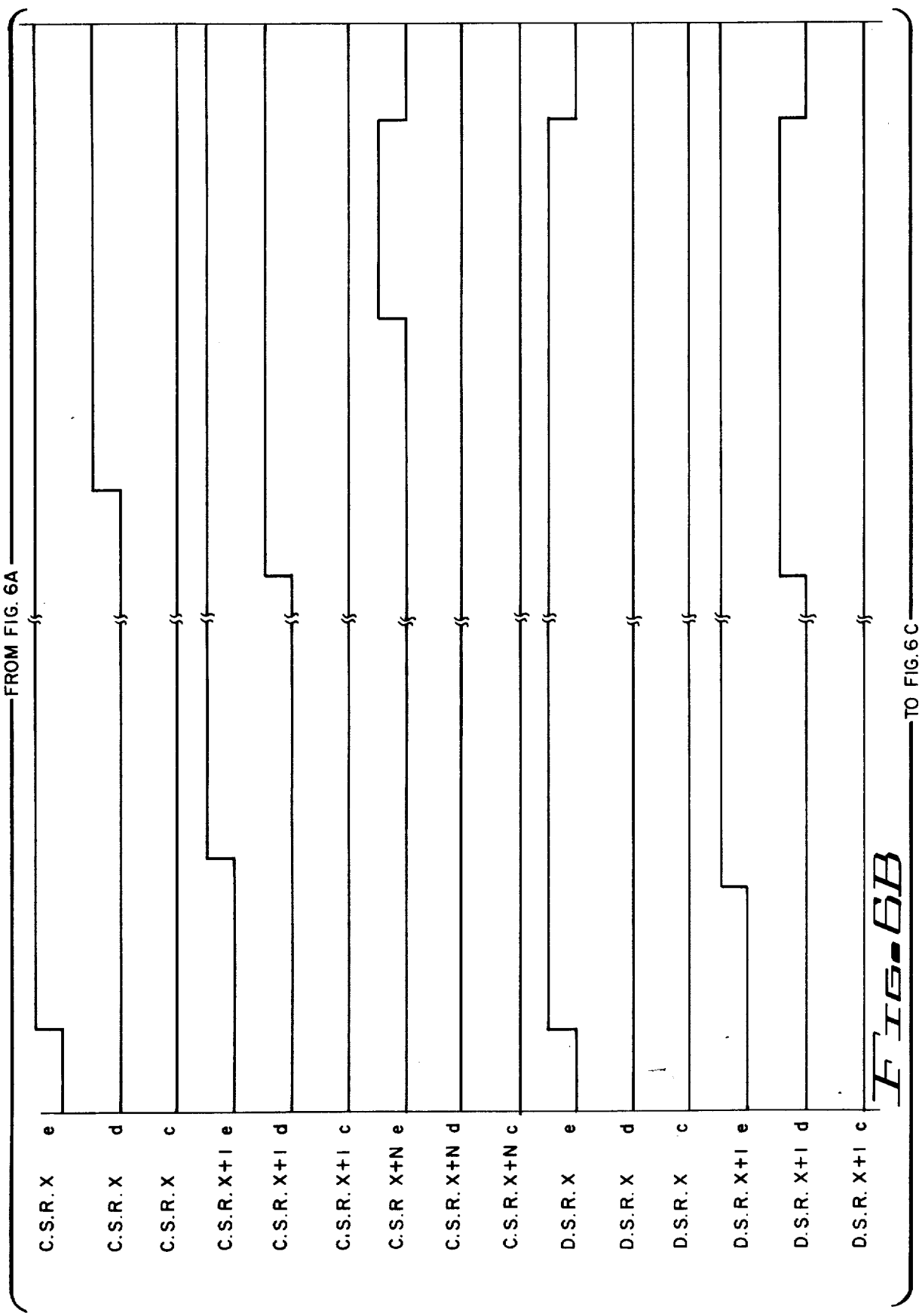

MULTIPLE BIT DESKEW BUFFER

CROSS-REFERENCES TO RELATED APPLICATIONS

1. Apparatus for Digital Data Recovery from Mass Storage Devices by Edward R. Besenfelder, Steve Cantrell, Charles Cobeen, bearing Ser. No. 807,711, filed June 17, 1977, and assigned to the same assignee as the instant invention.

2. Deskewing Buffer Arrangement Which Includes Means For Detecting and Correcting Channel Errors invented by David D. Devoy, et al., bearing Ser. No. 321,094, filed Jan. 4, 1973, now issued as U.S. Pat. No. 3,792,436, and assigned to the same assignee as the instant invention.

3. Apparatus for Deskewing Data Signals in a Multi-Track Recording System invented by Marion L. Town bearing Ser. No. 326,707, filed Jan. 26, 1973, now issued as U.S. Pat. No. 3,789,400 and assigned to the same assignee as the instant invention.

4. Inter-Channel Time Displacement Correction Method and Apparatus invented by Jan S. Hedin bearing Ser. No. 154,420, filed June 18, 1971 and now issued as U.S. Pat. No. 3,708,783.

PRIOR ART STATEMENT

The apparatus described in U.S. Pat. No. 3,789,400, while performing a similar function to that described in the instant invention, it is to be distinguished in that the "Apparatus for Deskewing Data Signals in a Multi-Track Recording System" requires a separate control oscillator for each data track as well as being considerably more complex and requiring more parts than the instant invention. Another advantage that the instant invention has over the Town's invention is that in utilizing the Town's system each bit must be clocked through as many separate buffering stages as are included in the system before that bit is available to be outputted in a deskewed byte. The instant invention provides for a first in/first out data positioning arrangement, wherein the first data bit is not required to be shifted through each of the multiple bit stages prior to being able to be outputted to the byte processing device.

The "Deskewing Buffer Arrangement which Includes Means for Detecting and Correcting Channel Errors" of U.S. Pat. No. 3,792,436 is also more complex and requires more parts than the instant invention. In addition, a separate pseudo clock is required for each of the nine channels, whereas the instant invention runs all nine channels synchronously to one reference clock. As with the Town's patent, this invention is a trickle through device, wherein each bit must be clocked through all buffering sections before it is capable of being outputted to the data utilization device.

The Interchannel Time Displacement Correction Method and Apparatus described in U.S. Pat. No. 3,708,783 is a complex, parts-consuming device that requires the insertion of a sync word in each track for each bit read in order for the data to be synchronized and deskewed at the output.

The Apparatus for Digital Data Recovery From Mass Storage Devices, U.S. Ser. No. 807,711 filed June 17, 1977 is cited as a reference to show how the input signals transmitted to the multiple bit deskew buffer are generated.

FIELD OF INVENTION

This invention relates generally to electronics circuitry used to retrieve and process digital data from mass storage devices. More specifically, the multiple bit deskew buffer provides a means for deskewing data from magnetic mass storage devices that substantially cuts down on error rate caused by deskew of the magnetic medium being read and also provides a versatile, programmable means of varying the size of the deskew buffer itself. It is to be noted that the instant invention does not require the use of any analog circuitry.

BACKGROUND OF THE INVENTION

Prior art apparatus used to deskew digital data read from mass storage devices utilized hybrid analog/digital circuitry to implement the circuitry necessary to generate the proper timing and control signals for deskewing multi-track data. Because of this utilization of hybrid devices, the prior art apparatus was not as adaptable to automatic testing procedures and, consequently, required greater amounts of labor with greater skills to test the equipment than that required by an all digital approach. Prior art devices also required a separate clocking mechanism for each of the data tracks resulting in the need for more circuitry than that necessary for the instant invention as well as requiring that each bit be shifted through all stages of the deskew buffer.

SUMMARY OF THE INVENTION

The multiple bit deskew buffer of the instant invention is designed to be utilized downstream from the digital data recovery apparatus with a data and error detector interface between the two. A position counter, position decoder/overload detector, control shift register, data shift register, error register, byte ready detector, and a byte buffer comprise the various components utilized to implement the deskewing operation. Except for the byte buffer detector and byte buffer, of which only one per system is required, the other portions of the multiple bit deskew buffer must be reproduced for each track of data being read. In the case of a nine track data system, in which case one of the tracks of data represents a parity bit, nine separate circuits would be required.

In operation the multiple bit deskew buffer keeps track of each data bit read by the corresponding data recovery device by use of a bit position counter which is decoded by the position decoder/overload detector and used by the control shift register and data shift register. The control shift register provides a bit ready signal when valid data is ready to be transferred to the byte buffer, while the data shift register maintains the relative positions of the bit ready signals and storage of the actual data bit itself. By selectively incrementing and decrementing the position counter as well as appropriate shifting of the shift registers, multiple data bits may be maintained in a manner for later alignment with the corresponding data tracks at the byte buffer. At the same time the position counter and position decoder/overload detector provides output signals that indicate either that an attempt is being made to store more bits of data than what the shift registers are capable of storing and, thereby introducing a track error into the computation, as well as a write mode overload signal that is used when writing into the mass storage device, which is also read at the same time, in order to ensure that any deskew that later occurs on a subsequent read is not caused by initial skewing in the write operation.

By ANDing all the bit ready signals to provide a signal indicating that all data bits of the record are ready to be read and also by ANDing the strobe signal for each of the data tracks to provide an output signal ensuring that no data in any track is in a transitionary mode, output signals are provided to the byte buffer for subsequent transmission to the interface that is to read the now deskewed byte of data. The output signals indicate to the interface that the byte buffer may now be read. Upon acceptance of the data by the interface an acknowledge signal is transmitted to the deskew buffer resetting the byte buffer and preparing the circuitry for the next deskewed byte transfer.

It is therefore an object of this invention to provide an all digital multiple bit deskew buffer apparatus for deskewing multi-track data bit from mass storage devices.

It is a further object of this invention to provide a deskew buffer apparatus utilizing a single master clock with all data manipulations and transfers synchronized to that single master clock.

It is a still further object of this invention to provide apparatus easily adaptable to expansion as well as firmware or software control.

BRIEF DESCRIPTION OF THE DRAWINGS

FIG. 4 is a schematic diagram of the byte buffer as associated control circuitry.

FIG. 5 is a flow diagram of the instant invention.

FIGS. 6A, 6B, and 6C are timing diagrams illustrating timing signals generated by an utilized in the multiple bit deskew buffer.

DETAILED DESCRIPTION OF THE PREFERRED EMBODIMENT

Figure 1:
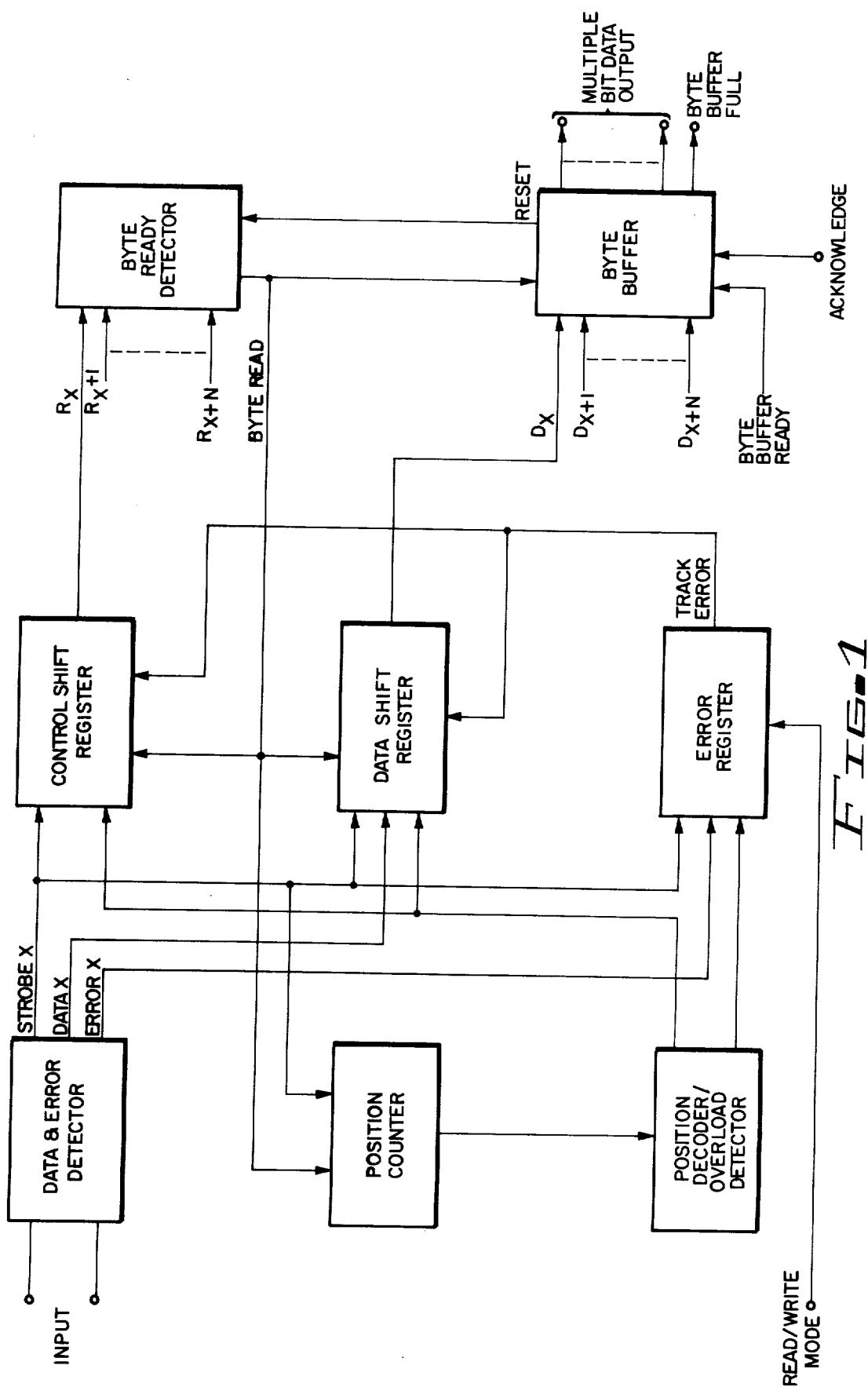
FIG. 1 is a block diagram of the instant invention.

The data and error detector depicted in FIG. 1 is more fully explained in U.S. Pat. No. 3,832,684 entitled "Apparatus for Detecting Data Bits and Error Bits in Phase-Coded Data." In addition, although not in the flow diagram, a master clock and data clock generated by the Apparatus for Digital Data Recovery from Mass Storage Devices, Ser. No. 807,711, filed June 17, 1977 is also utilized in the instant invention. As indicated in FIG. 1, a data and error detector, control shift register, position counter, data shift register, position decoder/overload detector, and error register is required for each track of data to be read from the storage device. In contrast the byte ready detector and the byte buffer are utilized only once in each system, their function being to operate on the signals provided from the control shift register and data shift register of each track of data. Although shown in FIG. 1, the error register is not described in the drawings insofar as it may be implemented in a straight forward manner with the use of a simple J-K flip-flop. The purpose of the register is to latch any error that occurs either because an error has been detected upstream in the data and error detector or if the overload detector indicates that when the mass storage device is being written into (and read from at the same time) a deskew of more than one bit occurs.

For the general case, when nine track data is being read, one track being used as a parity track, a single error in the data byte will not cause an incorrectible condition. Therefore, whenever a track error is encountered, the bit X ready and the bit X data lines are enabled for future correction by the error detecting and correcting circuitry downstream from the deskew buffer. In the event two or more tracks develop a track error, the entire record is voided and must be reread or passed over.

Figure 2:
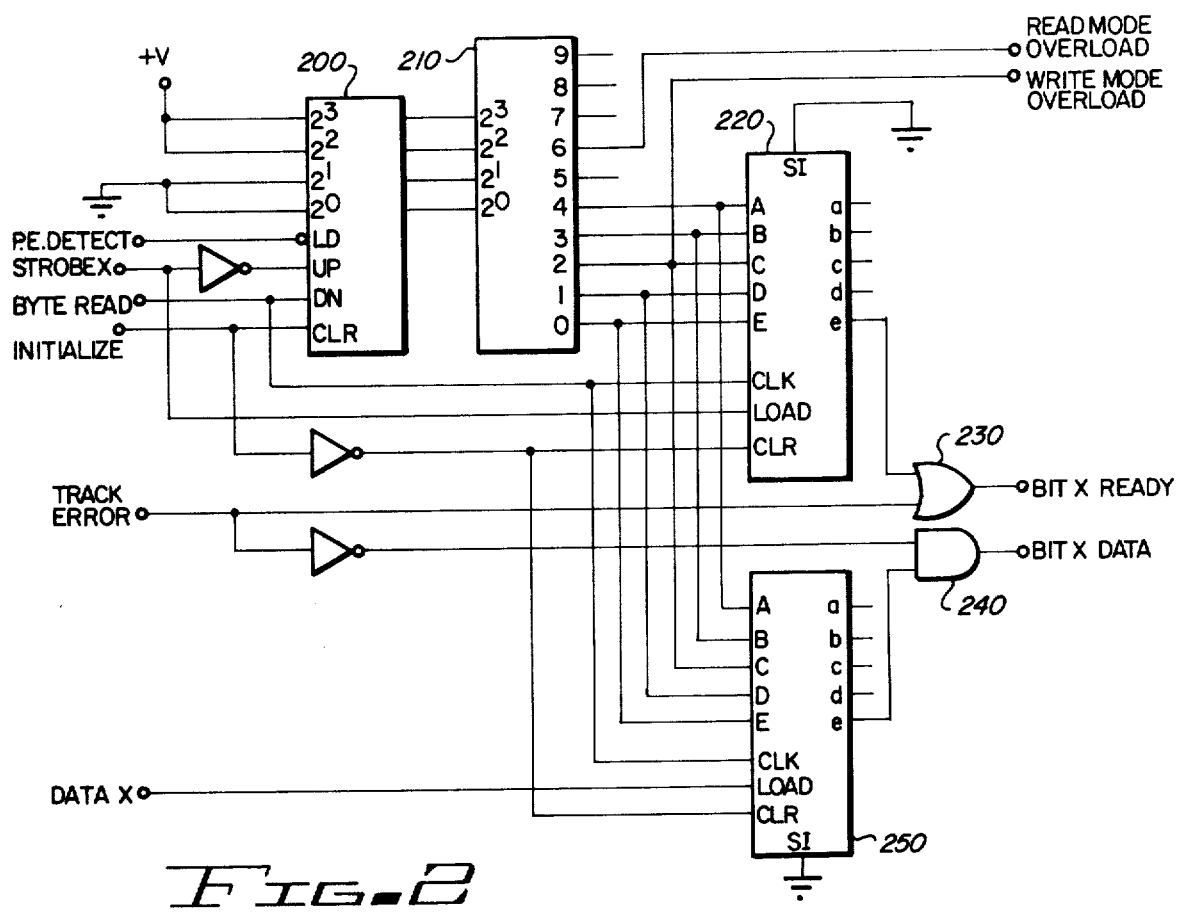
FIG. 2 is a schematic diagram of the position counter, position decoder/overload detector, data shift register, and control shift register.
Figure 3:
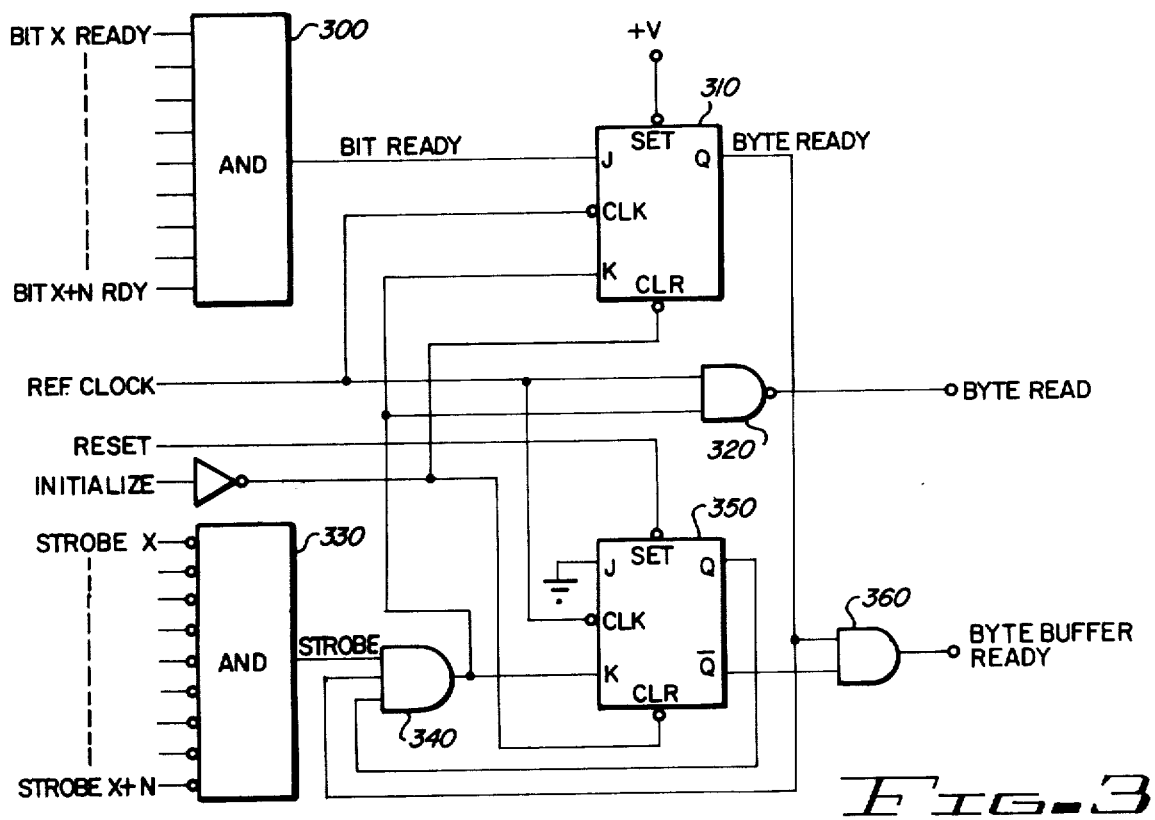
FIG. 3 is a schematic diagram of the byte ready detector.

FIG. 2 depicts the position counter 200, the position decoder/overload detector 210, the control shift register 220, and the data shift register 250. Position counter 200 is a four bit binary up/down counter with load and clear capability. The load inputs represent the binary number 1100. The load inputs are so fixed in order that when the counter load signal P.E. Detect. (postamble end detect) is a logical "0" utilizing the positive logic notation, the counter outputs will also be a binary 1100, thereby ensuring that no data can be transmitted through the control or data shift registers. When the P.E. Detect. signal is a logic "0" level, it represents that the data record being read no longer contains useful data and therefore any further data transmission would be erroneous. The initialize signal is connected to the clear inputs of the counter and registers to initialize these circuits prior to the beginning of the data block. It is active in the logic "1" stage. A strobe X signal generated by the data and error detector occurs simultaneously with the data X pulse and represents that valid data is on the data X line. The strobe X signal is used to increment the position counter as well as load the outputs of the position decoder/overload detector into the control shift register. It is important to note that both the control shift register and data shift registers are loadable with an active high signal at the load input and also that only logic "1's" can be loaded into the shift registers, i.e., if the logic "1" has been previously loaded into a register stage, or has been shifted to that stage, a load signal with a "0" level input will not change the register outputs signal corresponding to the register input for that stage. The byte read signal generated in FIG. 3 is used to decrement the position counter and clock both the control shift register and data shift register. The clock input is overridden by an active high signal at the load input. When either of the shift registers is clocked, the data at output "a" is transferred to "b," from "b" to "c," etc., at the same time the serial input being tied to ground inputs a logical level "0" at the "a" output. A high level signal at the track error input forces the bit X ready output to be a logic "1" and the bit X data to a logic "0" state. In this manner a track with a track error will always be ready to be read with a logic "0" data bit always being an input into the byte buffer. As mentioned previously, so long as only one track is in error, the error correction and detection circuitry downstream will adjust this particular tracks data to the correct logic level. The data X input is used to enable the load function of the data shift register, since the strobe X signal is coincident with the data X signal when both are logic "1's," and the position counter is not clocked until the falling edge of the strobe X, pulse the data X pulse enables the current count in the position decoder/overload detector to be loaded into the data shift register prior to clocking of the position counter. An example of how this would work would be as follows: after the initialization pulse has cleared the position counter and the shift registers, the "0" output of the position decoder is a logic "1" and is connected to the "e" inputs of both the control shift register and the data shift register. If the first data bit is a logic "1", a logic "1" is loaded into the "e" position of both of the shift registers and on the falling edge of the strobe X pulse the position counter is clocked to the binary 0001 state which in turn causes the "1" output of the position/decoder into the logic "1" state. When a logic "1" input having been loaded in the "e" position of both registers, the bit X ready output is a logical "1" as is the bit X data output. These signals being inputs to the byte ready detector and byte buffer respectively. If second logic "1" data input is received prior to transfer of the data from the byte buffer, a logic "1" is then loaded into position "d" of both the registers. At this time there is therefore a logic "1" output of both the "d" and "e" outputs of both of the registers and the position/decoder has a logic "1" output "a" position. If at this time, the first byte of data is ready to be transferred and is, in fact, transferred, the byte read signal will clock the down clock input of the position counter and the position/decoder output will become a logic level "1" at the "1" output and a logic "0" at the "2" output, at the same time the two registers are shifted such that the logic level "1" at the "d" output is transferred to the "e" output and the data that previously existed at the "e" output is lost, that data byte associated with that bit having already been read. If the next data bit is a "0," a logic "1" is loaded into the "d" input of the control shift register but not the data shift register, since a logic "0" data bit does not activate the load function of the register. In this instance the "d" and "e" outputs of the control shift register are both logic "1's" indicating that two data bits have been stored, while the "d" and "e" outputs of the data shift register are a "0" and "1" respectively, indicating the data corresponding to the control shift register stages.

In this manner up to five bits of data can be tracked by the control shift register, while the corresponding data bits are stored in the data shift register.

FIG. 3 of the schematic diagram of the byte ready detector. As mentioned supra, only one byte ready detector per system is required, the necessary signals from each of the multiple tracks being used as inputs to the detector. Operation of the byte ready detector is as follows:

The initialize pulse clears the Q output's of flip-flops 310 and 350 to the logic "0" state. Subsequently, as the different bit X ready signals from each of the data tracks become a logic "1" signal, i.e., indicating that the bit in that track is ready to be read, the output of AND gate 300 will go to a logic "1" state and, upon occurrence of the next reference clock, the Q output of flip-flop 310 will go to the logic "1" state, thereby enabling the output of AND gate 360. The output of AND gate 360 when the go to a logical "1" state, since upon receipt of the initialize pulse the $\bar{Q}$ output of flip-flop 350 became a logic "1." Until such time as the output of AND gate 340 goes to a logic "1" state, none of the flip-flop outputs or AND/NAND outputs of the byte ready detector will change. However, with the byte ready buffer ready signal now being a "1," the interface will read the byte buffer and cause a reset signal, more fully described in the description of FIG. 4, to set flip-flop 350 and enable the output of AND gate 340 when such time as there is no active level signal in any of the strobe X lines. When the output of AND gate 340 becomes a logic "1" level, the byte read signal, the output of NAND gate 320 creates a negative going pulse upon the next reference clock. This byte read signal is used to clock the control and data shift registers as well as decrement the position counter. At the same time the byte read signal is generated, the Q output of flip-flop 310 will toggle from a logic "1" to a logic "0" level. This result is caused by the logical "1" output of AND gate 340 which is tied to the K input of flip-flop 310, with the bit ready signal at the J input a logic level "1" a reference clock will toggle the flip-flop. Having toggled flip-flop 310 the Q output goes from a logic "1" to a logic "0," forcing the output of AND gate 340 to a logic "0," the next logic "1" bit ready signal from AND gate 300 will cause the byte ready signal to go to a logic "1" level when the flip-flop is strobed by the reference clock. This sequence is repeated as necessary during the entire data record.

FIG. 4 is a schematic diagram of the byte buffer itself, along with its associated control circuitry. The byte buffer like the rest of the multiple bit deskew buffer circuitry is set to the proper initialize conditions by the initialize pulse which resets the multiple bit parallel in/parallel out register 400 as well as clears flip-flops 420 and 440. Subsequent to the initialize pulse byte buffer ready signal described in the detailed description of FIG. 3 will enable one-half of gate 410 when in the logic "1" state indicating that the byte buffer has valid data at all data inputs. At the same time the byte buffer full output of register 400 is a logic "0," having been reset by the initialize pulse. This ("0" signal) in connection with a high level byte buffer ready signal enables gate 410 and presents a logic "1" level signal at the J input to flip-flop 420, which on the falling edge of the next master clock will toggle the Q output for the logic "0" to logic "1" state. The master clock as described in the apparatus for digital data recovery from mass storage devices is a multiple of the reference clock described in FIG. 3. With the Q output of flip-flop 420 a logic "1" NAND gate 430 will now pass the next master clock pulse which in turn will transfer the data and the byte buffer ready inputs from the input side of register 400 to the output side, and at the same time disable the output of gate 410 which in turn causes the Q output of flip-flop 420 to the logic "0" state on the next master clock pulse. The acknowledge signal is transmitted from the receiving device, i.e., the interface, to the byte buffer as soon as the byte presented has been read. A high level acknowledge signal allows the next master clock pulse to clock the $\bar{Q}$ output of flip-flop 440 from a logic "1" to a logic "0" state and reset flip-flop 350 of FIG. 3 as mentioned previously. At the same time the $\bar{Q}$ output of flip-flop 440 goes to the logic "0" state the Q output goes to the logic "1" state enabling NAND gate 450 to pass the next master clock pulse through gate 460 resetting the parallel in/parallel out register 400 and enabling the apparatus to be ready to begin the next sequence.

FIG. 5 is a flow diagram of the decision making and actions taken by the multiple bit deskew buffer.

The timing diagrams of FIGS. 6A, 6B, and 6C are illustrative of the signal utilized by and generated in multiple bit deskew buffer. For purposes of illustration it should be noted that the abbreviation P.C. stands for a position counter output, C.S.R. represents the control shift register, and D.S.R. is an abbreviation for data shift register.

While the principles of the instant invention have now been made clear in an illustrative embodiment, there will be many modifications as to the structure, arrangement, proportion, elements, materials and components that are obvious to those skilled in the art without departing from those principles. The appended claims are therefore intended to cover and embrace any such modification within the limits of the true scope and spirit of the invention.

I claim:

1. In a data processing system which utilizes a plurality of apparatus for reading digital data from mass storage devices and a plurality of data and error detectors, a multiple bit deskew buffer comprising:
   a plurality of bit tracking and storing sections, each of said sections comprising:
      a position counter responsive to a one of said plurality of data and error detectors for determining the number of bits stored in the section;
      a position decoder/overload detector responsive to the outputs of the position counter for providing individual error signals and a digital count of the number of bits stored in the section;
      a control shift register responsive to said digital count and to the data and error detector for providing a bit ready output signal indicating that a bit of data from that section is now ready to be read;
      a data shift register responsive to said digital count and to the data and error detector for providing a data output corresponding to the bit ready output signal of the control shift register; the data shift register also providing means for storing a plurality of data bits;
      an error register responsive to the data and error detector and to the error signals from the position decoder/overload detector for providing a track error signal when an error is detected, said track error signal forcing the bit ready output signal to indicate that a bit is ready to be read and forcing the data shift register data output to indicate that a logic "0" data bit is ready to be read;
   a byte ready detector responsive to the bit ready output signal of each of said control shift registers and to the strobe output signal of each of the data and error detectors for providing an output signal indicating that one byte of data is properly aligned and ready to be transmitted, and
   a byte buffer responsive to the output of the byte ready detector and the data output of each of said data shift registers for providing one byte of deskewed data as an output.

2. A multiple bit deskew buffer as recited in claim 1, wherein said position counters further comprise a multiple bit, up/down, binary counter with load and clear capabilities.

3. A multiple bit deskew buffer as recited in claim 1, wherein said position decoder/overload detector further comprises a binary to decimal decoder, the decimal (2) output being an error output when the system is operating in the write mode and the decimal (6) output being an error indicator when operating in the read mode.

4. A multiple bit deskew buffer as recited in claim 1, wherein said control shift register and said data shift register comprise a multiple bit, parallel in/parallel out, serial clocked shift register with load and clear capabilities; the load function so configured as to allow the loading only of logical "1" inputs.

5. The multiple deskew buffer as recited in claim 1, wherein said error register further comprises means for detecting an error signal from either the data and error detector or the control shift register and providing a track error signal output when an error input signal occurs.

6. A multiple deskew buffer as recited in claim 1, wherein the byte ready detector further comprises;
   a first multiple bit AND gate each of whose input is connected to a one of said plurality of control shift register bit ready output signals for providing a signal indicating that all bit tracking and storage sections are ready to transfer one bit of data to the byte buffer;
   a second multiple input AND gate each of said inputs connected to a one of said plurality of data and error detector strobe output signals for providing a signal indicating that none of the bit tracking and storage sections is in the process of accepting a bit of data from the data an error detector; and
   control means responsive to the outputs of the first and second AND gates for providing a byte read signal and a byte buffer ready signal.

7. The multiple bit deskew buffer as recited in claim 1, wherein the byte buffer further comprises:
   a multiple bit parallel in/parallel out resettable register, said register connected to the data shift register data output signal of each of said sections and the byte buffer ready output of the byte ready detector for latching a deskewed byte of data for transfer; and
   control means for providing a reset signal to the byte ready detector after the deskewed byte of data has been read from the register.

8. A multiple bit deskew buffer for use in a device for reading multi-track data from mass storage devices utilizing a data and error detector in each data track comprising:
   a plurality of data positioning means for providing a bit ready signal and a data signal, each of said plurality of positioning means comprising;
      counter means responsive to a corresponding one of the data and error detectors for providing an output signal indicative of the number of bits of data that has been read but not yet transferred from the positioning means;
      decoding means connected to the counter means for providing a unique output for each state of said counter means and a plurality of error signals;
      data storage means responsive to the data and error detector and the counter means for storing bits of data that have been read but not yet transferred from the position means;
      control means responsive to the decoder means for providing an output signal corresponding to a one of the bits of data stored in the data storage means;
      error recognition means connected to the corresponding data and error detector and the decoder means for providing an error signal that will force the output of the data storage means and the control means to a predetermined state;
      byte detection means responsive to the output of each of said control means for providing an output signal indicating that each bit of the data byte is now deskewed and ready to be transferred; and
   byte buffer means connected to the output of each of said data storage means for providing a multiple deskewed byte output.

* * * * *